April 3, 1928.
E. O. SCHJOLIN
1,664,706
AIR PUMP FOR BRAKE SYSTEMS
Original Filed Nov. 24, 1924    5 Sheets-Sheet 1
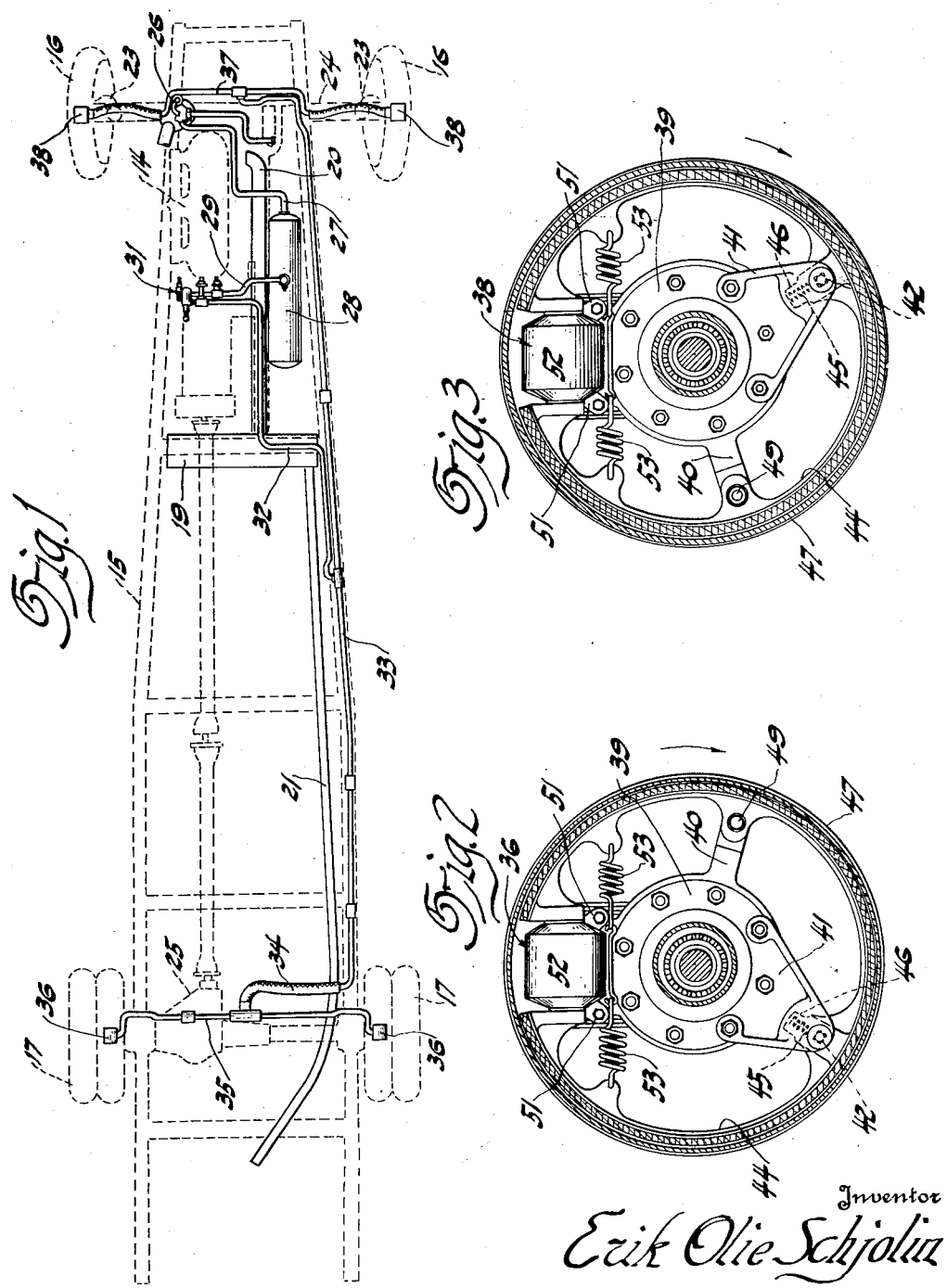
Inventor
Erik Olie Schjolin
By Blackmore, Spencer & Hulit
Attorneys April 3, 1928.
E. O. SCHJOLIN
1,664,706
AIR PUMP FOR BRAKE SYSTEMS
Original Filed Nov. 24, 1924  5 Sheets-Sheet 2
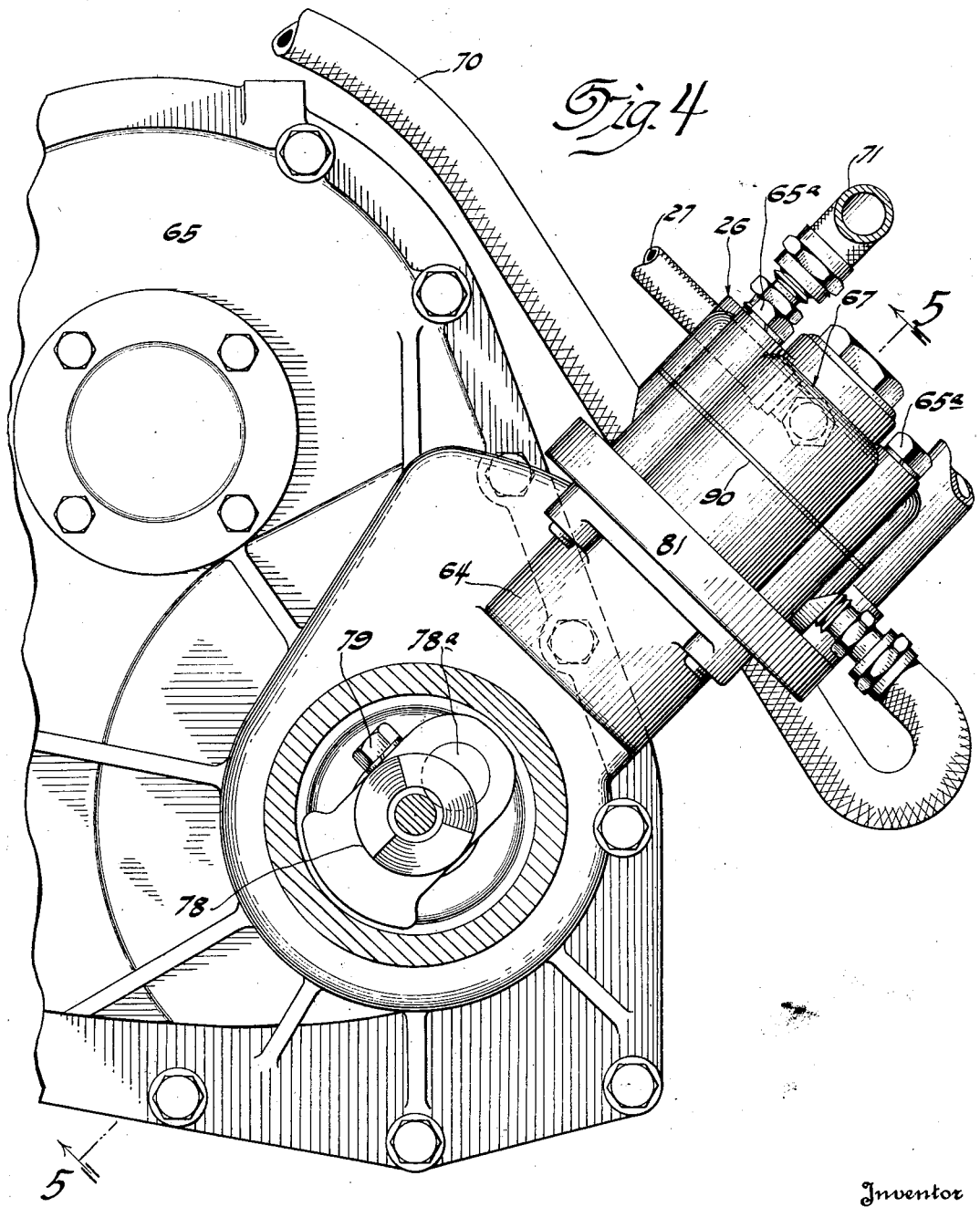

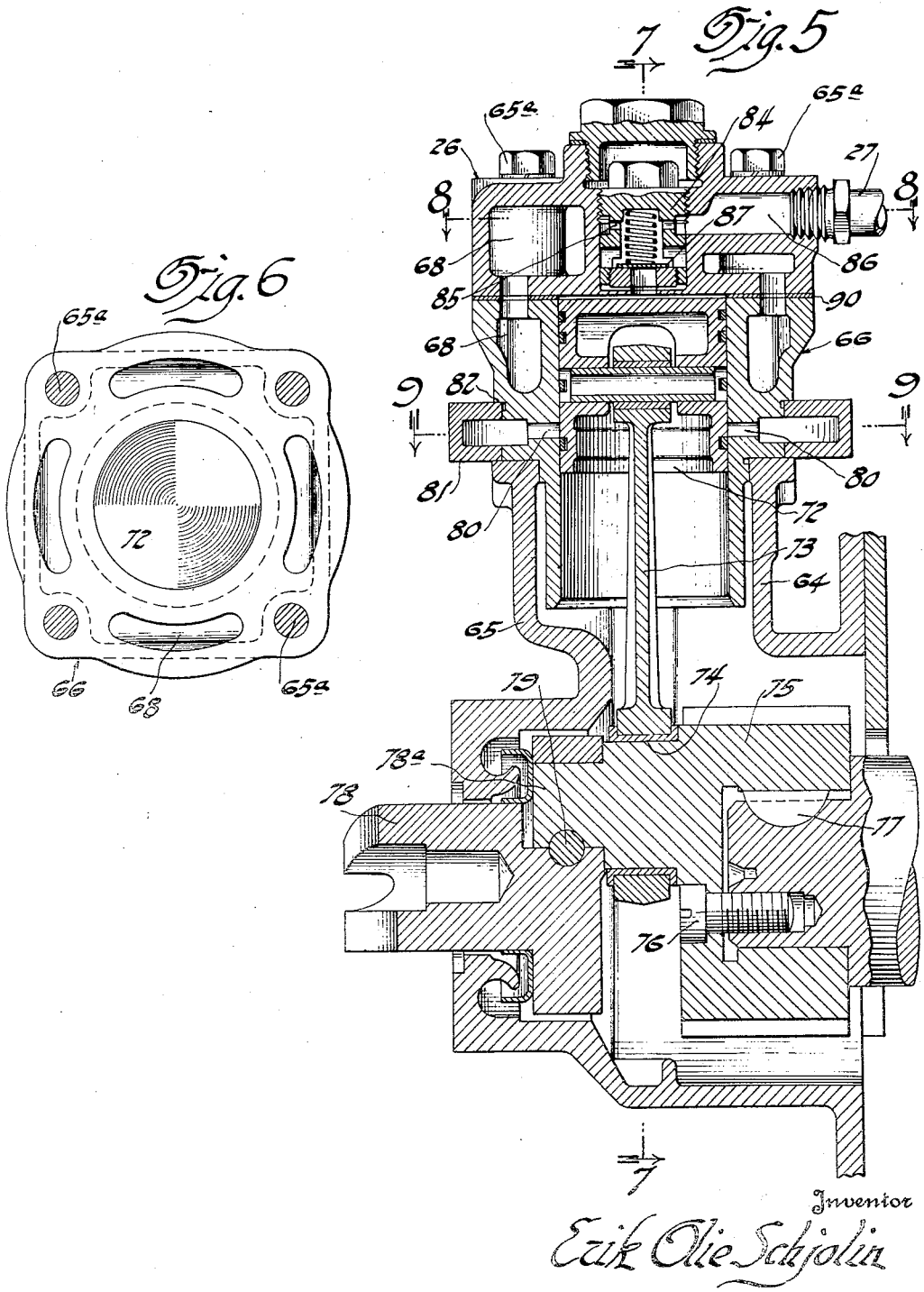

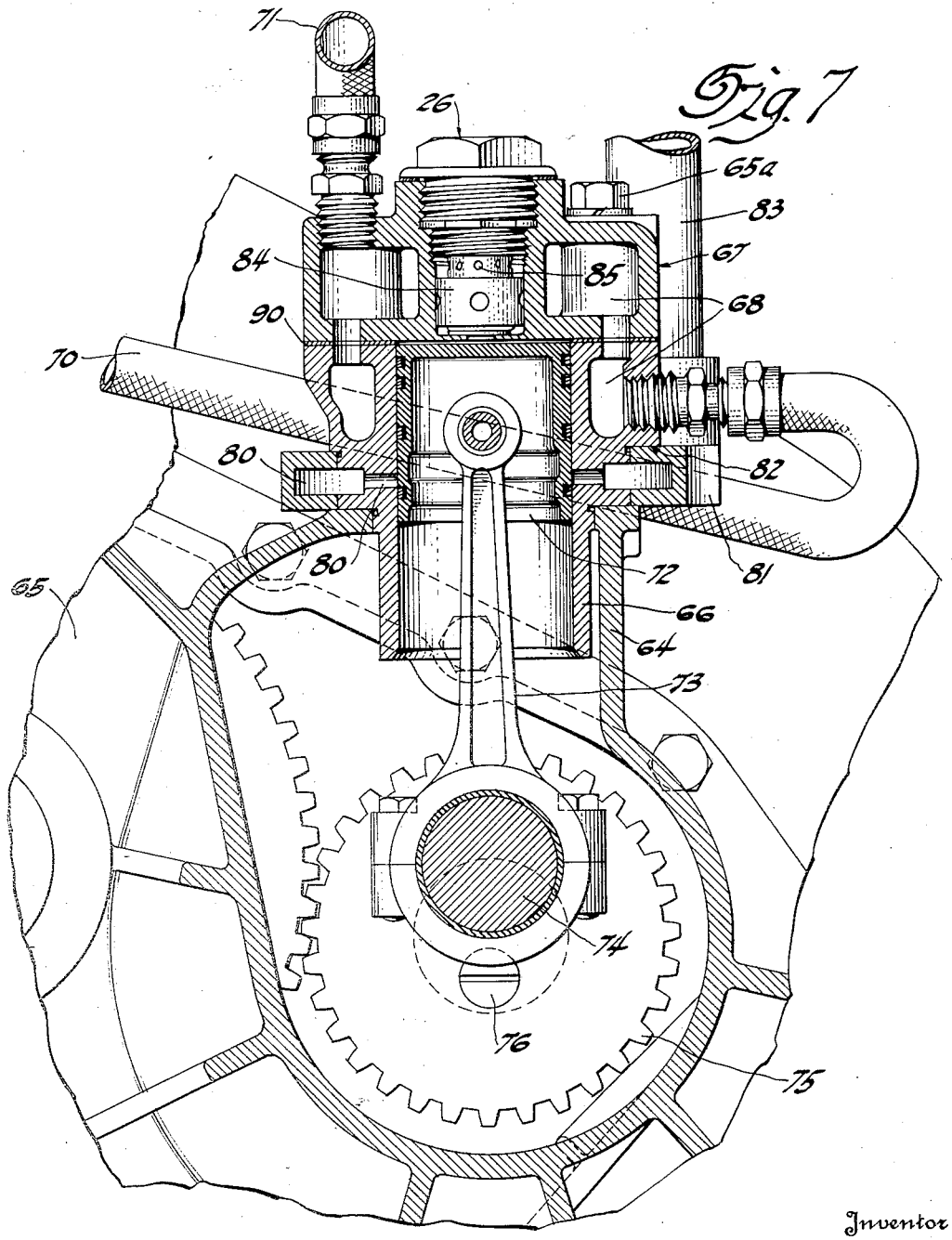

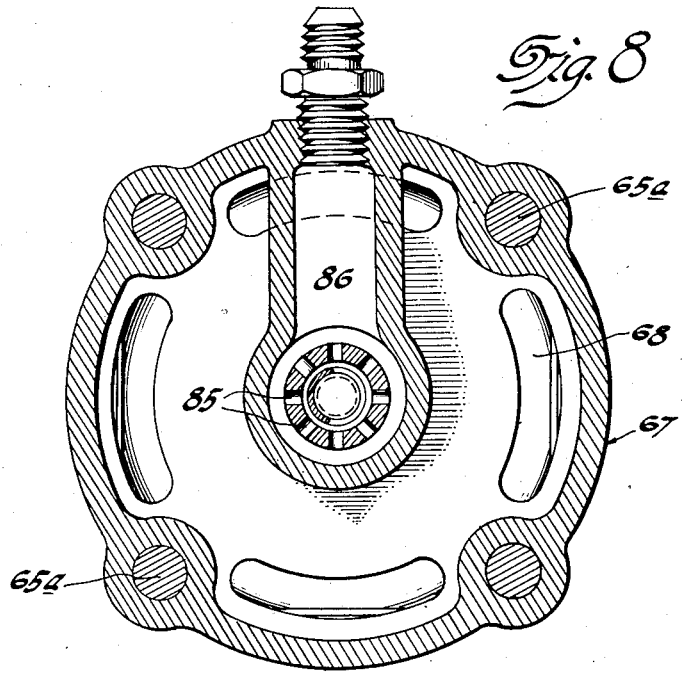
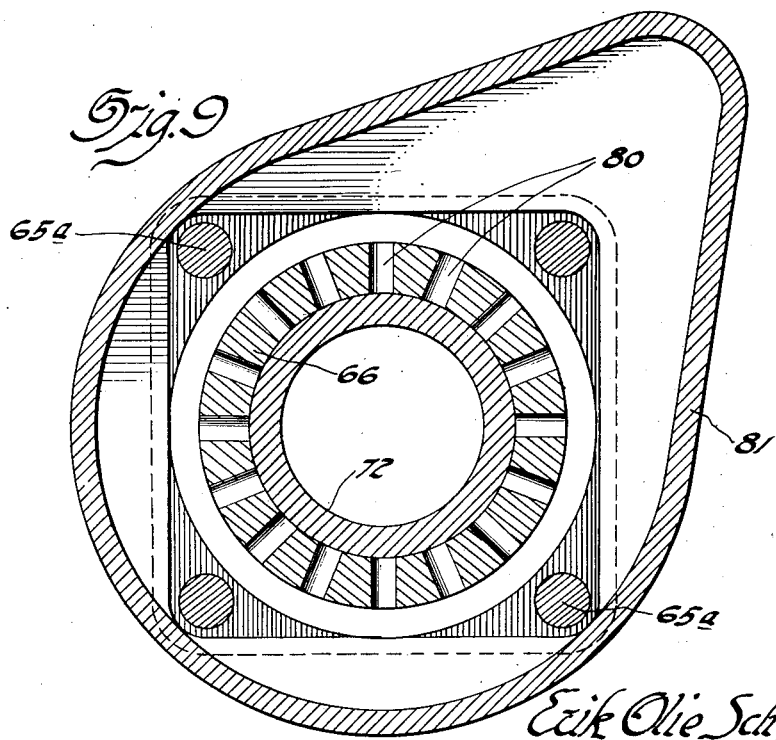

Patented Apr. 3, 1928.

1,664,706

UNITED STATES PATENT OFFICE.

ERIC OLIE SCHJOLIN, OF CHICAGO, ILLINOIS, ASSIGNOR TO GENERAL MOTORS CORPORATION, OF DETROIT, MICHIGAN, A CORPORATION OF DELAWARE.

AIR PUMP FOR BRAKE SYSTEMS.

Original application filed November 24, 1924, Serial No. 751,755. Divided and this application filed July 2, 1926. Serial No. 120,110.

This invention relates to improvements in air brake systems for vehicles and more particularly for motor vehicles, and the principal object of the invention is to provide a pneumatically operated brake system which, among other advantages, is simple in construction and arrangement, effective in operation, and easily controlled.

One of the main objects of my invention is to arrange the brakes for the front and rear wheels so that the braking effort of the rear brakes is greater than that of the front brakes, while at the same time parts of the front and rear brake mechanisms are alike in construction. To this end the points of mounting the brake bands for the front and rear wheels are arranged off-center and so positioned that the braking effort exerted on the rear wheels is greater than that exerted on the front wheels, though the air pressure in the brake cylinders for operating the brakes for the front wheels is the same as that in the brake cylinders for the rear brakes.

Another object of my invention is to provide an improved control valve which is simple in design, readily adjustable, sensitive in operation, subject to minimum wear and extremely efficient in controlling the system.

A further object of my invention is to mount the air pump, for supplying air to the system, in a novel position and in a novel manner on a housing of the internal combustion engine for propelling the vehicle, and to design the pump so that it is simple in construction, efficient in operation, and will not become unduly heated.

Still another object of the invention is to provide improved balanced valves at appropriate points in the system so that in the event of leakage of air from part of the brake system, such as in case of breakage of a pipe thereof, the leaking portion of the pipe or system will be automatically closed and the effective operation of the remainder of the system will not be impaired or interfered with.

With the above and incidental objects in view, the invention consists in certain novel features of construction and combination of parts, the essential elements of which are recited in the appended claims and a preferred form of embodiment of which is described in detail hereinafter and illustrated in full in the accompanying drawings which form part of this specification.

Of said drawings, Fig. 1 is a top view of a chassis of an automobile with an air brake system, embodying my invention, applied thereto, the chassis and wheels being shown more or less diagrammatically in dotted lines for the sake of illustration.

Figs. 2 and 3 are side elevations (looking inwardly) of the braking mechanisms for a rear and a front wheel respectively, with the brake drums shown in section.

Fig. 4 is a front elevation of part of the internal combustion engine showing the air pump in position thereon.

Fig. 5 is a sectional view taken through the air pump and the driving means therefor, the section being taken on the line 5—5 of Fig. 4.

Fig. 6 is a top plan view of the cylinder of the pump. Fig. 7 is another sectional view through the pump and the supporting casing, being taken on the line 7—7 of Fig. 5.

Fig. 8 is a transverse sectional view through the head of the pump, the section being taken on line 8—8 of Fig. 5.

Fig. 9 is a transverse section through the cylinder of the pump and the air inlet casing, being taken on line 9—9 of Fig. 5.

This application is filed as a division of my prior application, Ser. No. 751,755 for air brake systems for vehicles, filed November 24, 1924, this present application being directed more particularly to the air compressor shown and described in the earlier application.

Referring to Fig. 1 of the drawings, the chassis comprises the usual frame 15, front wheels 16, rear twin wheels 17, and an internal combustion engine 14. An exhaust pipe 20 extends from the engine exhaust manifold to a muffler 19, and an exhaust pipe 21 extends from the muffler to the rear of the vehicle, these parts being shown more or less diagrammatically. The front wheels are mounted on steering knuckles 23, of any desired form, pivoted to the ends of a front axle 24. The rear wheels are mounted on the divided axle-shafts housed by a rear axle housing 25.

The air brake system, embodying my invention, comprises in general, an air pump 26 mounted on the engine 14 and connected by a pipe 27 to a pressure tank 28, a control valve 31 or device connected by a pipe 29 to the tank 28 and adapted to control the passage of compressed air through a pipe 32 which is connected to the central portion of a pipe 33, rear air brake cylinders 36, mounted as presently described, and connected to the rear end of the pipe 33 through a pipe 35 and a flexible pipe or hose 34, and front air brake cylinders 38, mounted on the steering knuckles 23, as presently described, and connected to the front end of the pipe 33, through a pipe 37 the end portions of which are flexible to permit the wheels to be turned by the steering mechanism.

It will be obvious that when compressed air has been admitted to the brake cylinders 36 and 38 the free ends of the brake band are expanded and the brake lining is forced against the flange of the drums of the wheels, the braking effort being dependent upon the pressure of the air admitted to the brake cylinders under the control of the control valve.

It will be observed by referring to Figs. 2 and 3 that the blocks 42 are mounted off-center so that each brake band is divided into two arms, one of which is substantially longer than the other. The block for each rear brake is mounted rearwardly of the center of the brake band while the block for each front brake is positioned forwardly of the center of its brake band. This arrangement constitutes a very important feature of my invention, as it permits a greater braking effort to be applied to the rear wheels than to the front wheels, although the pressure of the air admitted to the brake cylinders of the front and rear brake mechanisms is the same, while at the same time the front and rear brake mechanisms are alike in construction. The braking effort on the rear wheels is greater than on the front wheels because the longer arms of the brake bands for the rear wheel are forwardly of their blocks 42 while the shorter arms of the front brake bands are forwardly of the blocks, and the direction of rotation of the wheels causes the longer arms of the rear brake bands to be forced more firmly against the flanges of the rear brake drums than are the shorter front arms of the front brake bands against the flanges of their brake drums. By this arrangement the rear wheels may be locked without locking the front wheels and I have preferably designed my system so that the maximum air pressure which can be applied is sufficient to lock the rear wheels but not the front wheels, and this is important because when the front wheels of a vehicle become locked control of the vehicle is lost in case of skidding, while so long as the front wheels are not locked the vehicle may be steered by the steering mechanism.

Referring now to Figs. 4 to 9, the air pump for supplying air to the brake system, is mounted on a housing or cover 65, bolted to the front of the internal combustion engine, the housing being adapted to house certain timing or driving gears or connections, as best illustrated in Figs. 5 and 7. The pump comprises a cylinder 66, mounted in an opening in a tubular extension 64 in the casing 65 and bolted thereto by bolts 65ª extending through openings in the head 67 and cylinder 66 of the pump and the extension 64. The head and cylinder are provided with communicating water jackets 68 which are supplied with water from the internal combustion engine cooling system through an inlet pipe 70, the water escaping back into the cooling system through an outlet pipe 71. The pump is water-cooled in order to prevent excessive heat being generated within the pump, which would result in condensation of any moisture in the air pumped by the pump, which is constantly operated and carbonization of the lubricating oil is also reduced to a minimum.

Mounted in the cylinder is a piston 72 reciprocated through a piston rod 73 and an eccentric 74 formed integral with a gear 75, (or chain sprocket if a chain drive rather than gears are employed) which is rigidly mounted on the forward end of the engine shaft by a screw 76 and a key 77 (Fig. 5). A projecting clutch member 78 is fastened to an extension 78ª of the gear by a pin 79, this clutch member being provided so that the engine may be started by a hand crank in the well-known manner.

The pump cylinder 66 is provided with a plurality of radiating openings 80 communicating with a flat shallow casing 81 as best shown in Figs. 5, 7 and 9. The casing 81 is clamped between the upper edge of the tubular extension 64 of the casing 65 and an annular shoulder 82 on the cylinder. Air is supplied to the casing 81 through a vertical pipe 83, shown in Figs. 4 and 7, to which may be applied an air cleaner of any approved construction for removing dust and all foreign matter from the air being supplied to the air pump. Mounted in the central bore in the head 67 of the pump is a hollow valve casing 84 having radiating openings 85 communicating with a conduit or passage 86 formed within the head, as best shown in Fig. 8. The front end of the pipe 27, which leads to the storage tank 28, is connected to the nipple screwed into the outer end of the conduit 86. The valve casing 84 houses a disc valve 87 (Fig. 5) which is normally spring-pressed to close the opening leading from the cylinder to the valve casing. It will be observed that a gasket 90, positioned between the head and cylinder, is quite thick so that when the piston is at the upper end of its stroke there is a clearance space above the piston in order that the air within the cylinder is not compressed to the extent which it would be were this clearance space not provided, the clearance space being such that the pump at each stroke can only compress the air in the cylinder to the desired maximum air pressure.

Referring now to Fig. 1, it will be seen that the pressure tank 28 is positioned adjacent to and heated by the exhaust pipe 20, the control valve 31 is near the rear end of the internal combustion engine 17 and is heated thereby, and pipe 32 and the rear half of pipe 33 are in close proximity with and heated by the exhaust pipes 20 and 21. This arrangement is of advantage as there is no sudden change in temperature of the air (which is heated during compression in the air pump 26) as it passes through the pipe 27, tank 28, pipe 29, control device 31, pipe 32 and the rear part of pipe 33, and hence condensation of moisture and other objectionable results due to sudden temperature changes in the air, are avoided.

In the pipe unions, by which the rear end of the pipe 32 is connected to pipe 33, the rear end of the flexible hose 34 is connected to the branch pipes 35 and the forward end of the pipe 33 is connected to the branch pipes 37. I provide balanced valves fully described in my prior application referred to, which serve the purpose of closing either branch pipe 33, either branch pipe 35, or either branch pipe 37, as the case may be, in the event of excessive leakage from the pipe (as in case of breakage) or one of the brake cylinders, so that the operation of the remainder of the system will not be affected or impaired.

It will be observed that the rear end of the flexible hose 34 is connected to the middle of the branch pipe 35 which is rigidly secured to rear axle housing 35 while the forward end of the hose 34 is connected to the rear end of the pipe 33 rigidly secured to one of the side sills of the chassis frame. In prior air brake systems for road vehicles two flexible pipes, one on each side of the chassis frame, have been used to supply air to the rear brake cylinders. Flexible pipes or hose are apt to crack or break and, therefore, I reduce this liability by using one flexible hose instead of two. The branch pipes 35 and the pipe 33 may be of copper.

Referring to the pump, it will be seen that my invention very conveniently provides for the association of the pump with the vehicle engine, positioning the pump at the front end where a casing carries the pump cylinder. The casing also encloses the timing gears, one of which is formed with an eccentric for driving the pump piston and an extension of this gear is used for mounting the attachment with which the starting crank may be coupled. Another advantage consists in the lubrication of the moving parts of the pump by the engine lubricating system, as will be obvious.

I claim:

1. In a road vehicle, the combination of an engine for propelling the vehicle and having a casing mounted thereon, an air pump mounted on said casing and comprising a cylinder and a piston, a gear mounted on the end of the crank shaft of said engine and provided with an eccentric, a connecting rod connected to said piston and driven from said eccentric, a starting clutch member secured to said eccentric and air cylinders supplied with compressed air by said pumps.

2. In a road motor vehicle, the combination of an engine for propelling the vehicle and having driving connections for driving parts of the engine from the crank shaft of the engine, a casing for housing said driving parts and having an integral tubular extension, an air pump comprising a cylinder and a piston with the cylinder mounted in said tubular extension, a piston rod connected to said piston, and an extension on said crank shaft for driving said piston.

3. In a road motor vehicle, the combination of an engine for propelling the vehicle and having a casing, an air pump comprising a cylinder mounted in said casing and a piston in said cylinder, and an air inlet chamber comprising a shallow box clamped in position between said casing and a shoulder on said cylinder.

4. In a road motor vehicle, the combination of an internal combustion engine for propelling the vehicle, of a water cooling system therefor, an air brake system including an air pump for supplying compressed air to the brake system and comprising a cylinder and a head having communicating water jackets, and inlet and exhaust water pipes connected to the said water jackets and said water cooling system of the internal combustion engine.

In testimony whereof I affix my signature.

ERIC OLIE SCHJOLIN.